United States Patent [19]

Ratanagsu

[11] Patent Number: 5,023,960
[45] Date of Patent: Jun. 18, 1991

[54] TOILET FLAPPER VALVE CONTROL APPARATUS

[76] Inventor: Srinkarn Ratanagsu, 7752 Bellaire Ave., North Hollywood, Calif. 91605

[21] Appl. No.: 512,427

[22] Filed: Apr. 23, 1990

Related U.S. Application Data

[63] Continuation-in-part of Ser. No. 425,599, Oct. 23, 1989.

[51] Int. Cl.5 .......................... E03D 1/35; E03D 1/14
[52] U.S. Cl. ............................ 4/393; 4/391; 4/394; 4/381; 4/324
[58] Field of Search ............... 4/415, 391, 392, 393, 4/394, 402, 324, DIG. 1, 379, 381, 385, 386, 384

[56] References Cited

U.S. PATENT DOCUMENTS

| | | | |
|---|---|---|---|
| 1,208,621 | 12/1916 | Mossinghoff | 4/381 |
| 1,952,583 | 3/1934 | Coltman | 4/381 |
| 4,028,748 | 6/1977 | Schoepe et al. | 4/393 |
| 4,032,997 | 7/1977 | Phripp et al. | 4/415 |
| 4,160,294 | 7/1979 | Crumby | 4/324 |
| 4,216,555 | 8/1980 | Detjen | 4/324 |
| 4,483,024 | 11/1984 | Troeh | 4/394 |
| 4,651,359 | 3/1987 | Battle | 4/415 |
| 4,945,581 | 8/1990 | Harris | 4/415 |

Primary Examiner—Henry J. Recla
Assistant Examiner—Keith Kupferschmid
Attorney, Agent, or Firm—Jack C. Munro

[57] ABSTRACT

A water saver device to be connectable to the flushing mechanism of a conventional toilet. The device causes the conventional flapper valve of the discharge opening of the toilet tank to close prematurely prior to discharge of the entire contents of the tank. The device is to be adjustable so that during the flushing action of the conventional toilet, between fifty to seventy percent of water is used from what would normally be used. There is a second embodiment which permits selecting of either a full flush or a half flush.

3 Claims, 2 Drawing Sheets

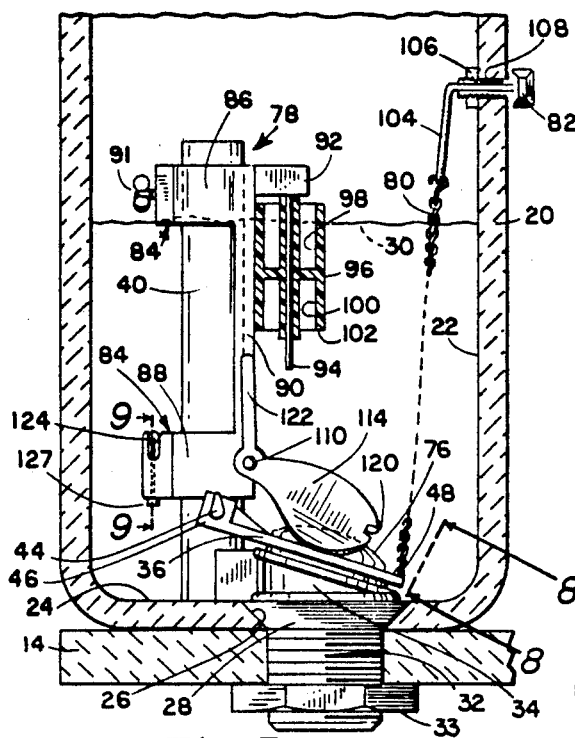
Fig.5
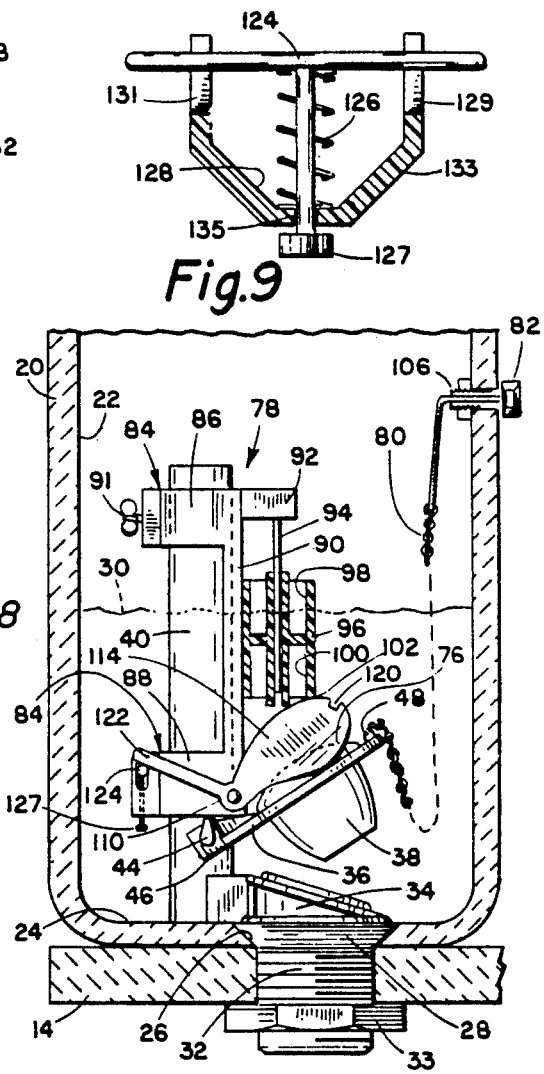
Fig.9
Fig.6
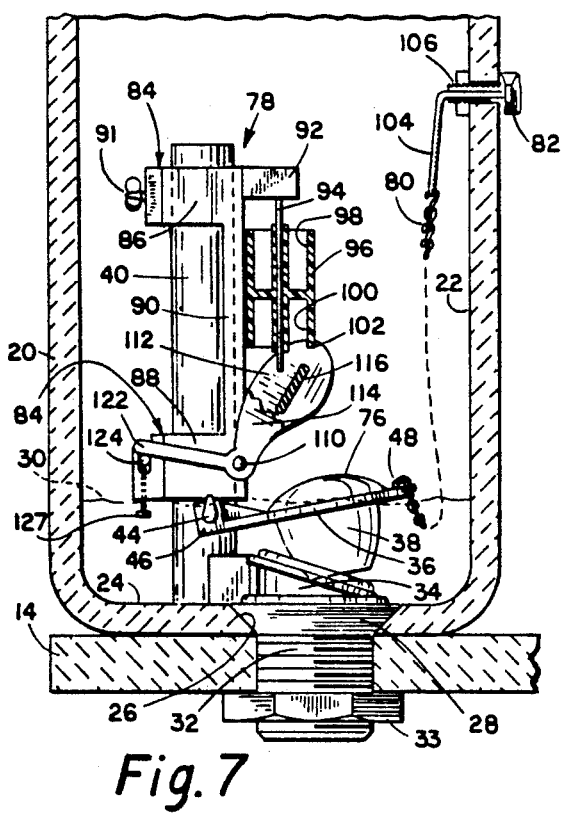
Fig.7
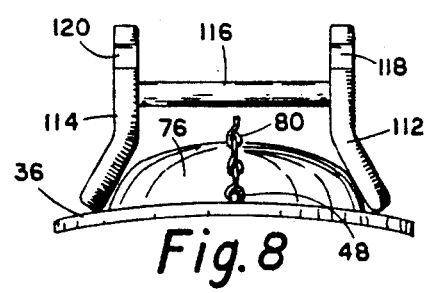
Fig.8

TOILET FLAPPER VALVE CONTROL APPARATUS

REFERENCE TO PRIOR APPLICATION:

This patent application is a Continuation-in-Part of U.S. Pat. application Ser. No. 07/425,599, entitled TOILET FLAPPER VALVE CLOSING APPARATUS by the same inventor, filed Oct. 23, 1989.

BACKGROUND OF THE INVENTION

The field of this invention relates to water saving devices and more particularly to an attachment for the mechanism of a conventional toilet which will substantially decrease the amount of water that is utilized during the flushing procedure of the toilet.

The water closet, or toilet, is in widespread usage for human beings to dispose of waste products. A typical toilet comprises a bowl within which the waste product is to be deposited. Connected to the bowl is a tank. Within the tank is a flushing mechanism. Upon activation of the flushing mechanism, the water from the tank is to flow by gravity into the bowl. Within the bowl there is created a siphon which will cause the contents of the bowl to be discharged into a connecting sewer pipe.

The toilet is most advantageous since it removes waste quickly and inoffensively. The use of the toilet is also incorporated with modern plumbing techniques which prevent air from the waste pipes emerging into the home, thereby not releasing any noxious gases within the home.

In the past, the common widespread usage of toilets (water closets) was due to the widespread availability of watter. However, water, in some areas of the world, is becoming not so available. Also, the fact that the population is ever increasing creates an even greater demand for water. Many communities are restricting the maximum allowable water to be used within toilets. Some communities are now even further giving incentives for users to incorporate some form of a water save mechanism within their toilets. The amount of water that is used in a conventional toilet is actually more than is required to effectively remove human waste. It has been found that in most instances the amount of water could be decreased as much as fifty percent and still adequate removal of the waste will occur.

SUMMARY OF THE INVENTION

The device of the present invention discloses a first embodiment directed to an attachment for a conventional toilet which will cause the toilet to operate in its normal manner but using thirty to fifty percent less water than normal. The device includes a float block which is a combination weight and float. When the water level in the water tank of the toilet is at its highest, the float block floats within the water. Flushing occurs by moving of a flapper valve to an open position. As the water level lowers, the float block moves and comes into contact with the flapper valve. As the float block continues to lower losing its buoyancy, pressure is applied against the flapper valve which will ultimately result in the flapper valve being closed. This closing procedure occurs with therebeing approximately thirty to fifty percent of the water still remaining within the tank. Associated with the float block is an adjustable contact member for flapper valve which can be adjusted to permit only thirty percent of the water to remain within the tank after the flushing occuring, or to permit as much as fifty percent of the water to remain within the tank. There is a second embodiment of this invention which incorporates a pivotable arm assembly between the float block and the flapper valve. The float block functions to close the flapper valve prematurely to decrease the amount of water used to approximately fifty percent of normal. However, when activating the pull chain assembly in order to flush the toilet, and the pull chain assembly is momentarily retained in the flushing position, the float block is moved to latch with the arm assembly which holds the float block and the arm assembly in a spaced position from the flapper valve which causes the toilet to flush in a normal manner with substantially all of the water contained within the tank being discharged.

One of the primary objectives of the present invention is to construct a simple inexpensive attachment for a conventional toilet which will cause the conventional toilet to operate in a manner to conserve water.

Another objective of the present invention is to provide a device which can be quickly and easily attached onto the mechanism of a conventional toilet without requiring the use of any special tools and also which can be attached by even an unskilled individual.

Another objective of the present invention is to construct an attachment for a conventional toilet which permits the toilet to be operated in either a full flush or half flush mode by utilizing of the conventional flushing mechanism of the toilet in just a slightly different manner.

BRIEF DESCRIPTION OF THE DRAWINGS

FIG. 5 is a cross-sectional view similar to FIG. 2 but showing the second embodiment of the present invention;

FIG. 6 is a cross-sectional view of the second embodiment of the present invention similar to FIG. 3;

FIG. 7 is a cross-sectional view of the second embodiment of the present invention which is similar to FIG. 5 with the exception that the flapper valve control means is in the latched position permitting the flushing operation of the toilet to be in the full flush mode;

FIG. 8 is a front end view of the flapper valve control device of the present invention taken along line 8—8 of FIG. 5; and FIG. 9 is a back view of a portion of the second embodiment of the present invention taken along line 9—9 of FIG. 5.

DETAILED DESCRIPTION OF THE SHOWN EMBODIMENT

Figure 1:
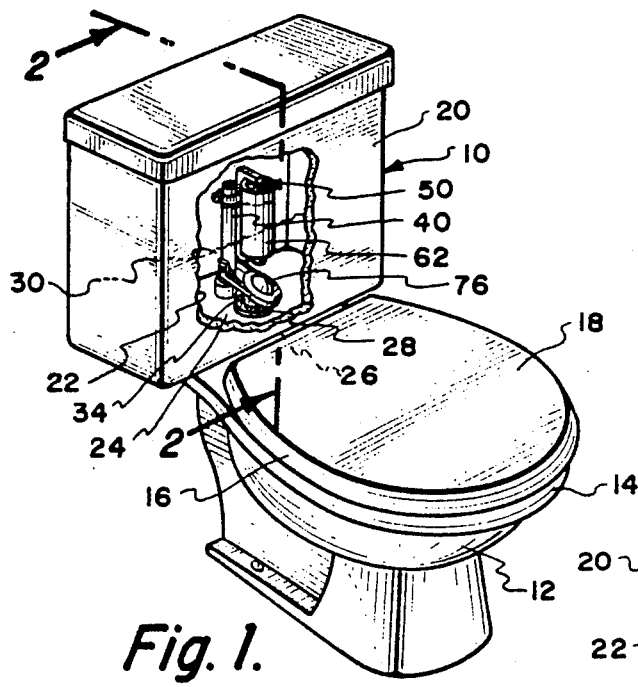
FIG. 1 is an isometric view, partially cut away, of a conventional toilet within which the first embodiment of the device of the present invention has been installed.
Figure 4:
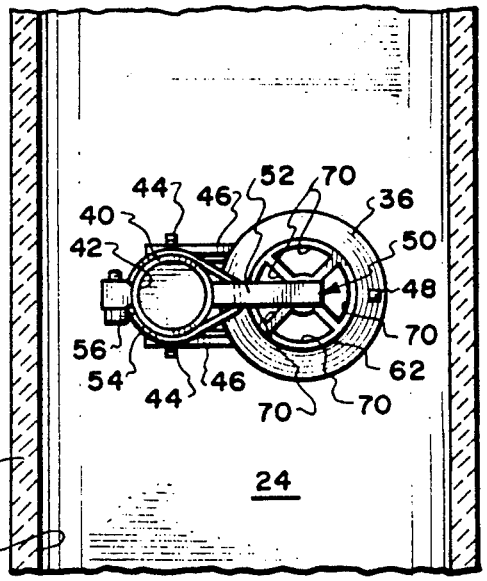
FIG. 4 is a top plan view of the device of the present invention taken along line 4—4 of FIG. 2.

Referring particularly to the drawings, there is shown in FIG. 1 a conventional toilet 10 having a toilet bowl 12 which has an enlarged upper access opening (not shown) defined by rim 14. On the rim 14 is a toilet seat 16. Covering the seat 16, when not in use, is a cover 18. Mounted on the bowl 12 is a toilet tank 20. The tank 20 includes an internal chamber 22. Formed within the bottom wall 24 of the tank 20 and connecting with the internal chamber 22 is a discharge opening 26. Surrounding the discharge opening 26 is a valve seat 28. The valve seat 28 is integrally formed on a exteriorly threaded conduit 32. There is a nut 33 mounted on the conduit 32 which is to be used to fixedly position the conduit 32 on the tank 20. The water 30 is to flow through the discharge opening 26, through conduit 32 and through an appropriate passageway into the bowl 12.

Valve seat 28 includes an inclined section 34. In the inclined section 34 is an appropriate opening. A rubber or plastic flapper valve 36 is to be capable of resting on the inclined section 34 in a fluid tight manner. The flapper valve 36 has an iterior ball section 38 which is to fit within the interior of the inclined section 34.

Figure 2:
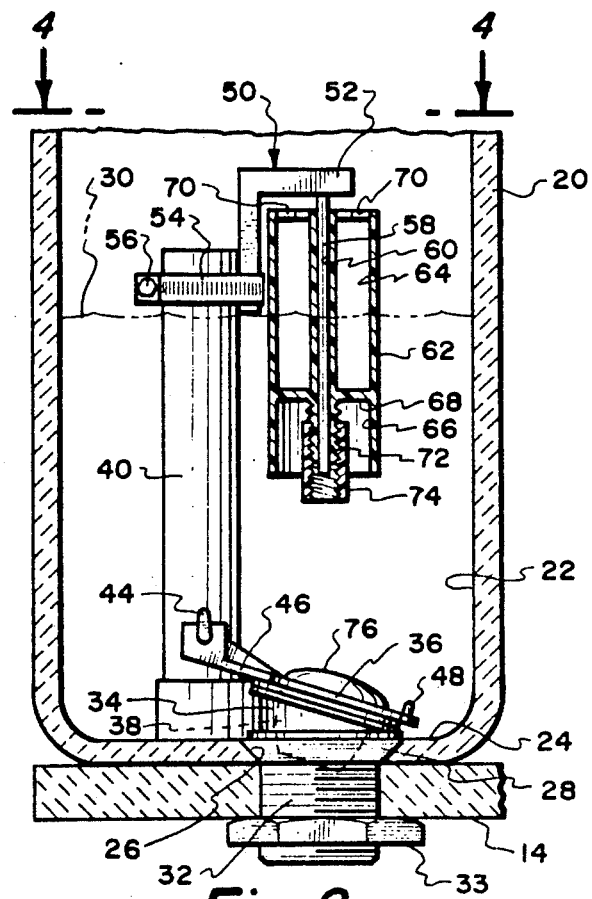
FIG. 2 is a cross-sectional view through the toilet tank of FIG. 1 taken along line 2—2 of FIG. 1 showing the device of the present invention as it would be located in the position with the toilet tank at its maximum water level.

Integrally connected to the inclined section 34 is an overflow tube 40. If for any reason the level of the water 30 reaches the height of the overflow tube 40, the water will flow through the interior passage 42 of the overflow tube 40, through conduit 32 to be disposed of within the bowl 12. Mounted in a diametrically spaced apart arrangement on the exterior of the overflow tube 40 are a pair of ears 44. The ears 44 are used to connect with the side flanges 46 to support the flapper valve 36. The flapper valve 36 is to be pivotable about the ears 44 between the open position shown in FIG. 3 to the closed position shown in FIG. 2.

The outer end of the flapper valve 36 has a pull chain attached to protrusion 48. This pull chain is not shown in FIGS. 1 through 4 of the drawings since the first embodiment 50 of this invention is independent of the pull chain. However, the second embodiment 78 of the invention shown in FIGS. 5 through 8 is connected to the pull chain 80 and such is shown. The pull chain connects to a handle assembly 82 (shown only in FIGS. 5-8) which is deemed to be conventional and is to be manually operated to move the flapper valve 36 from the closed position shown in FIGS. 2 and 5 to the open position shown in FIGS. 3 and 6.

Up to this point, the mechanism of the toilet 10 that has been described is deemed to be conventional. The first embodiment 50 of this invention includes an L-shaped support bar 52. Connected to one end of the support bar 52 is a clamping device such as an adjustable hose clamp 54. The hose clamp 54 is to be tightened by a conventional nut and bolt assembly 56. Fixedly mounted on the L-shaped support bar 52 directly adjacent to its outer free end is a support rod 58. The support rod 58 is positioned vertically and extends from the support bar 52 in the direction toward but short of the flapper valve 36.

Support rod 58 is located within elongated through opening 60 of a float block 62. The float block 62 is divided into a pair of chambers, an upper chamber 64 and a lower chamber 66. Separating the chambers 64 and 66 is a dividing wall 68. Chamber 64 is basically annular and is closed relative to chamber 66. Access into chamber 64 is provided through a plurality of holes 70 formed within the top of float block 62. It is to be noted that in referring to FIG. 4, there are four in number of holes 70. However, the hole arrangement 70 could be varied without departing from the scope of this invention.

Chamber 64 functions as a weight chamber. Some of the water 30 is to flow through the holes 70 and is to fill chamber 64. The water is to remain within the chamber 64. It is the function of the water 30 within the chamber 64 to provide a weight value to the float block 62 when buoyancy decreases.

The bottom surface of the float block 62 is open which permits air to fill the chamber 66. It is this air that provides sufficient buoyancy to the float block 62 so that the float block 62 will be located in the floating position substantially shown in FIG. 2 of the drawing.

Connecting with the through opening 60 and extending within the chamber 66 is an exteriorly threaded cylindrical extension 72. Threadably mounted on the extension 72 is an internally threaded sleeve 74. Sleeve 74 is to be threaded to occupy different positions relative to the extension 72. The outer free end of the sleeve 74 is designed to come into contact with the upper surface 76 of the flapper valve 36.

The device 50 of this invention is to be mounted by hose clamp 54 onto the overflow tube 40. Support bar 50 is positioned so that the support rod 58 is in alignment with the upper surface 76 of the flapper valve 36. The float block 62 is then immersed in the water 30 and then permitted to assume the floating position shown in FIG. 2. The operator then threadingly moves the sleeve 74 to a point to where it is believed that when the flapper valve 36 is closed a desired amount of water 30 remains within the internal chamber 22 of the tank 20.

Figure 3:
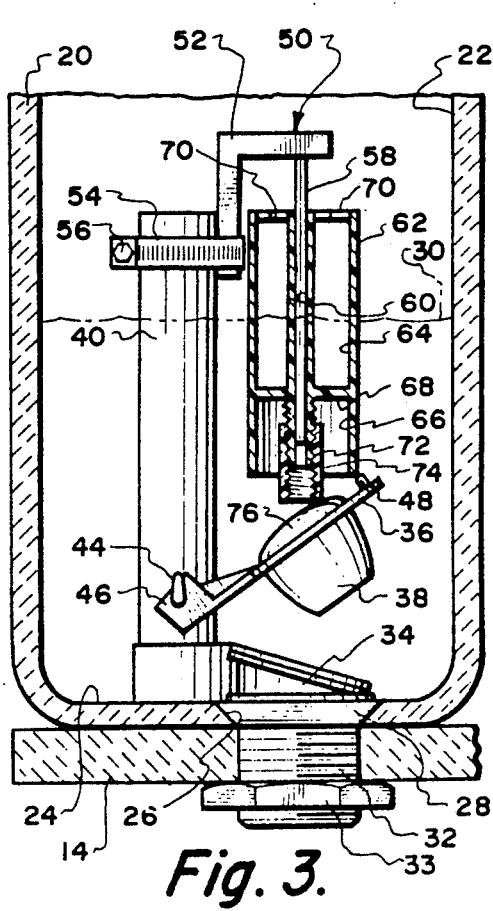
FIG. 3 is a view similar to FIG. 2 but showing the water level within the tank at a decreasing level showing the device of the present invention at an initial contact position with the conventional flapper valve which is used to close off the water discharge opening located at the bottom of the tank.

Now, during operation of the toilet 10, when the flapper valve 36 is moved to the open position shown in FIG. 3, the level of the water 30 lowers and as it lowers the free outer end of the sleeve 74 will come into contact with the upper surface 76 of the flapper valve 36. Continuing lower movement of the level of the water 30 will finally result in the weight of the float block 62 forcing the flapper valve 36 to the closed position shown in FIG. 2. If too much water 30 is discharged into the bowl 12, it is only necessary to further extend the sleeve 74 by threading in an outward direction relative to the extension 72. As a result, the flapper valve 36 will close earlier (prematurely) and therefore saving more of the water 30 in the internal chamber 22 of the tank 20. If it is determined that more water 30 is required within bowl 12, the user only needs to thread the sleeve 74 in a retracting direction (toward the divider wall 68) which will mean that more of the water 30 will be discharged into the bowl 12 prior to closing of the flapper valve 36.

Another advantage to the device 50 of this invention is that the water 30 which is subjected to the greatest pressure is discharged into the bowl 12. In other words, the head pressure is greatest during the first few seconds of the flushing action and it is this head pressure which performs the bulk of the flushing operation. Normally, the water 30 that is released in the bottom half of the internal chamber 22 actually performs little of the work of the flushing operation. Therefore, by using of the device 50 of this invention, the portion of the water 30 within the bottom of the internal chamber 22 is saved and is not discharged into the bowl 12.

Referring particularly to FIGS. 5 through 9 of the drawings, the second embodiment 78 of the present invention includes a mounting housing 84. The mounting housing 84 is constructed in the form of a pair of axially spaced apart ring members 86 and 88 which are interconnected by a brace 90. The ring members 86 and 88 are mounted on the overflow tube 40. Associated with ring member 86 is a wing-nut 91 that is used to fixedly clamp housing 84 in position on the overflow tube 40. The desired position is when the ring member 88 comes into contact with a portion of the ears 44.

Attached to ring 86 and extending outwardly therefrom is a support bar 92. Fixedly mounted to the undersurface of the support bar 92 is a thin elongated rod 94. A float block 96 is slideably mounted on the rod 94. Float block 96 is free to move on the rod 94. The float block 96 includes a water chamber 98 and an air chamber 100. Water chamber 98 is essentially similar to water chamber 64 and air chamber 100 is essentially similar to air chamber 66 of the float block 62 of the first embodiment 50 of this invention. Float block 96 has a lower outer edge 102 whose function will be described more further in this patent application.

The pull chain 80 is connected to an arm 104. Arm 104 includes a right angle extension 106 which is conducted through how 108 formed within the wall of the tank 20. Extension 108 is integrally connected to the handle 82 with it being understood that this handle 82 is to be manually moved between a substantially horizontal position shown in FIG. 5 to a ninety degree displaced position (not shown).

Mounted on the ring 88 is a pivot pin 110. Each end of the pivot pin 110 protrudes on opposite sides of the ring 88. On one side of the ring 88 there is pivotally mounted on the pin 110 an enlarged planar arm 112. Similarly pivotally mounted on the pin 110 on the opposite side of the ring 88 is a second identically shaped enlarged planar arm 114. Arms 112 and 114 are connected together by a connecting member 116. Arms 112 and 114 are to have a normal at-rest position against the top surface 76 of the flapper valve 36. Formed within the peripheral edge of arm 112 is a notch 118. Formed in the periphery of arm 114 is a similar notch 120. Notches 118 and 120 are to connect with bottom edge 102 of the float block 96 as is clearly shown in FIG. 7 of the drawings.

Arm 114 has integrally attached thereto an outward narrow extension 122. Arm 112 has a similar narrow extension (not shown). Both of these extensions (only extension 122 being shown) ride on T-bar 124 when the arms 112 and 114 are in the positions shown in FIGS. 6 and 7 of the drawings. The horizontal cross member of the T-bar 124 rides in slots 129 and 131 of pocket housing 133 which contains pocket 128. The vertical member of T-bar 124 passes through a hole formed in the bottom surface of pocket housing 133 and is attached to an enlarged head 127. Enlarged head 127 functions as a stop which prevents dislodgement of T-bar 124 from pocket 128.

The vertical member of T-bar 124 connects with a coil spring 126. The spring 126 is mounted within pocket 128. Movement of the arms 112 and 114 from the position shown in FIG. 6 to FIG. 7 causes the extensions 122 (and the other not shown) to press against the T-bar 124 and compress the spring 126. This movement of the arms 112 and 114 is caused when the pull chain 80 is made taut which positions the arms 112 and 114 so that when the water level 30 decreases, the lower edge 102 of the float block 96 will come into engagement with notches 118 and 120. Release of the handle 82 will cause the pull chain 80 to become slack. However, the arms 112 and 114 are latched to the float block 96 with a biasing force caused by the spring 126 attempting to pivot the arms 112 and 114 in a clockwise direction (referring to FIG. 7). As a result, the flapper valve 36 functions as a normal, full flush, toilet flapper valve with substantially the entire amount of water 30 being discharged from the tank 20.

Upon the internal chamber 22 becoming almost emptied of the water 30, the valve 36 will move to the closed position as shown in FIG. 5 of the drawings. At that time water is being resupplied by a mechanism (not shown) into the internal chamber 22. Once the water level has risen sufficiently to refloat the float block 96, float block 96 is refloated disengaging itself from the notches 118 and 120 of the arms 112 and 114, respectively. At this time, the spring biasing force 126 gives an initial impetuous to the arms 112 and 114 pivoting such clockwise which will result in the arms 112 and 114 assuming the position shown in FIG. 5 of the drawings being located directly in contact with the upper surface 76 of the flapper valve 36.

When the handle 82 is used in a normal manner without being momentarily held until the float block 96 engages with notches 118 and 120, the float block 96 will rest against the upper surface of the arms 112 and 114 and apply a downward force onto the flapper valve 36 as the water level 30 lowers, the buoyancy of the float block 96 will be lost and the weight of the float block 96 will cause the flapper valve 36 to be move to the closed position well prior to emptying of the internal chamber 22. This is to be known as the approximately one-half flush position of the toilet.

What is claimed is:

1. In combination with a toilet, said toilet having a tank, said tank having an internal chamber adapted to contain water, a discharge opening found within said tank and connecting with said internal chamber, a flapper valve mounted on said discharge opening, said flapper valve being movable between an open position and a closed position, said open position permitting flow of water from said internal chamber through said discharge opening, said closed position preventing flow of water through said discharge opening, an overflow tube fixedly mounted to said tank, said overflow tube located within said internal chamber directly adjacent said discharge opening, when said flapper valve is located in said open position said flapper valve is designed to remain in said open position until said internal chamber is almost empty of water, the improvement comprising:

flapper valve control means mounted on said overflow tube, said flapper valve control means to contact said flapper valve and cause said flapper valve to move from said open position to said closed position prior to completely emptying of said internal chamber of water, said flapper valve control means including a mounting housing, a float block movably mounted on said mounting housing, said float block having an interior chamber, said interior chamber being adapted to contain a quantity of water, said quantity of water combined with the weight of said float block to be sufficient to cause said flapper valve to move to said closed position prior to complete emptying of water within said internal chamber, said float block having an air chamber, said air chamber to cause said float block to float when immersed within the water within said internal chamber; and said flapper valve control means further including an arm assembly, said arm assembly being pivotally mounted on said mounting housing, said arm assembly being movable between an at-rest position and a latched position, said at-rest position being when said arm assembly is in physical contact with said flapper valve and as said flapper valve moves between said open and closed positions said arm assembly moves with said flapper valve maintaining said physical contact, said latched position being when said float block latchingly connects with said arm assembly permitting movement of said flapper valve away from said arm assembly which includes said closed position.

2. The combination as defined in claim 1 wherein:

a manually operated pull chain assembly connected to said tank, said pull chain assembly being movable between a flushing position and a dormant position, said pull chain assembly being connected to said flapper valve, with said pull chain assembly in said dormant position said flapper valve being in said closed position except when said tank is emptying of water, during movement of said pull chain assembly from said dormant position to said flushing position causes said flapper valve to move from said closed position to said open position and said arm assembly is pivoted toward said latched position, momentarily retaining of said pull chain assembly in said flushing position will result in said float block assuming said latched position with said arm assembly.

3. In combination with a toilet, said toilet having a tank, said tank having an internal chamber adapted to contain water, a discharge opening found within said tank and connecting with said internal chamber, a flapper valve mounted on said discharge opening, said are assembly being movable between an open position of said flapper valve and a closed position, said open position permitting flow of water from said internal chamber through said discharge opening, said closed position preventing flow of water through said discharge opening, an overflow tube fixedly mounted to said tank, said overflow tube located within said internal chamber directly adjacent said discharge opening, when said flapper valve is located in said open position said flapper valve is designed to remain in said open position until said internal chamber is almost empty of water, the improvement comprising:

flapper valve control means mounted on said overflow tube, said flapper valve control means to contact said flapper valve and cause said flapper valve to move from said open position to said closed position prior to completely emptying of said internal chamber of water, said flapper valve control means including a mounting housing, a float block movably mounted on said mounting housing, said float block having an interior chamber, said interior chamber being adapted to contain a quantity of water, said quantity of water combined with the weight of said float block to be sufficient to cause said flapper valve to move to said closed position prior to complete emptying of water within said internal chamber, said float block having an air chamber, said air chamber to cause said float block to float when immersed within the water within said internal chamber;

said flapper valve control means further including an arm assembly, said arm assembly being pivotally mounted on said mounting housing, said arm assembly being movable between an at-rest position and a latched position, said at-rest position being when said arm assembly is in physical contact with said flapper valve and as said flapper valve moves between said open and closed positions said arm assembly moves with said flapper valve maintaining said physical contact, said latched position being when said float block latchingly connects with said arm assembly permitting movement of said flapper valve away from said arm assembly which includes said closed position;

a manually operated pull chain assembly connected to said tank, said pull chain assembly being movable between a flushing position and a dormant position, said pull chain assembly being connected to said flapper valve, with said pull chain assembly in said dormant position said flapper valve being in said closed position except when said tank is emptying of water, during movement of said pull chain assembly from said dormant position to said flushing position causes said flapper valve to move from said closed position to said open position and said arm assembly is pivoted toward said latched position, momentarily retaining of said pull chain assembly in said flushing position will result in said float block assuming said latched position with said arm assembly; and when said arm assembly is in said latched position said arm assembly being spring biased tending to move said flapper valve out of said latched position toward said closed position.

* * * * *